R. WATSON.
TIME INDICATOR FOR AUTOMOBILES.
APPLICATION FILED APR. 30, 1919. RENEWED JUNE 10, 1921.

1,415,004.

Patented May 2, 1922.
3 SHEETS—SHEET 1.

Witnesses

Inventor
Robert Watson

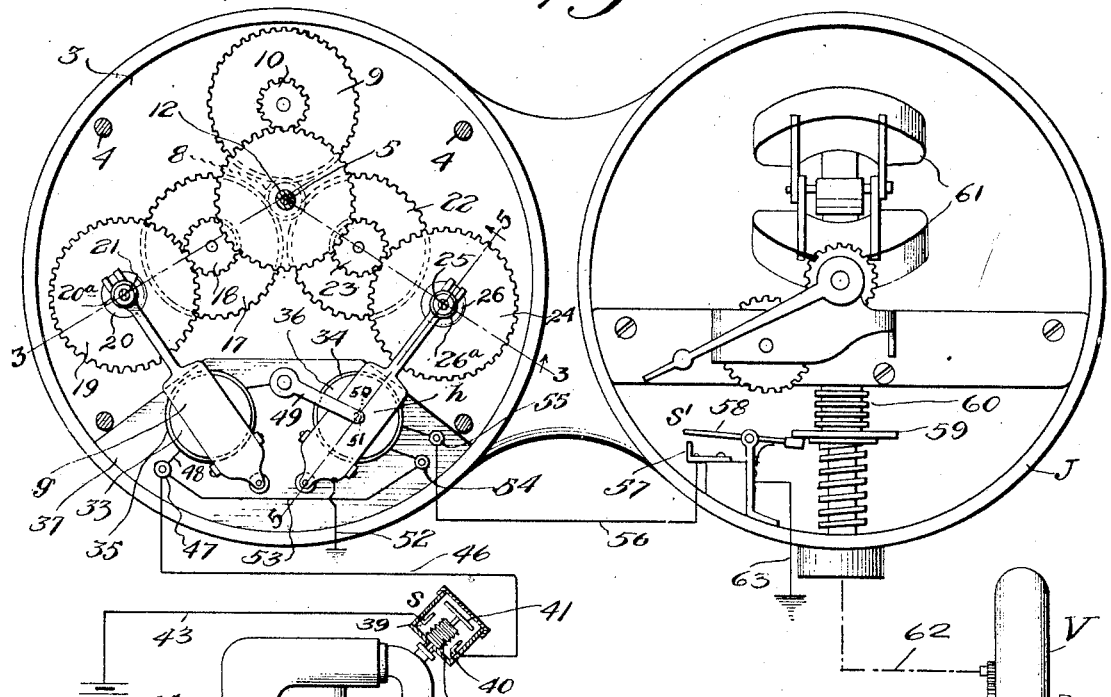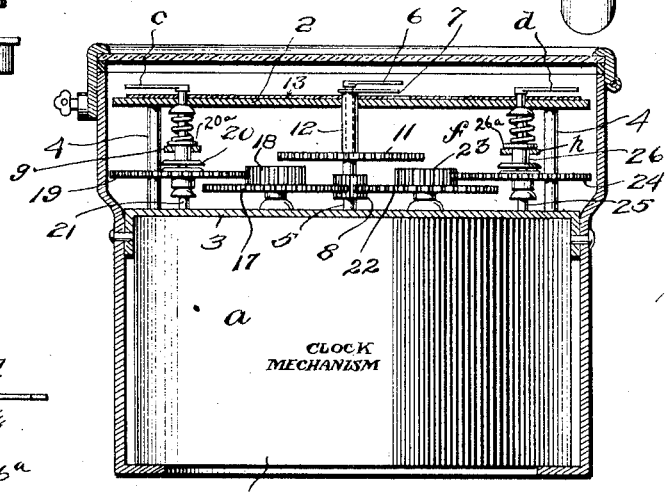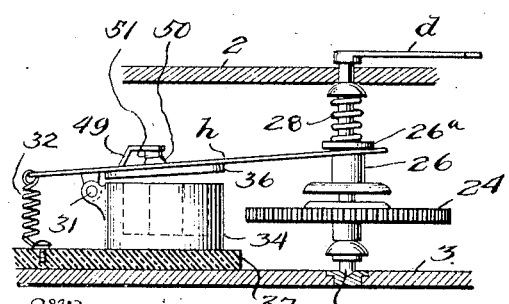

R. WATSON.
TIME INDICATOR FOR AUTOMOBILES.
APPLICATION FILED APR. 30, 1919. RENEWED JUNE 10, 1921.
1,415,004.
Patented May 2, 1922.
3 SHEETS—SHEET 3.
Fig. 7.
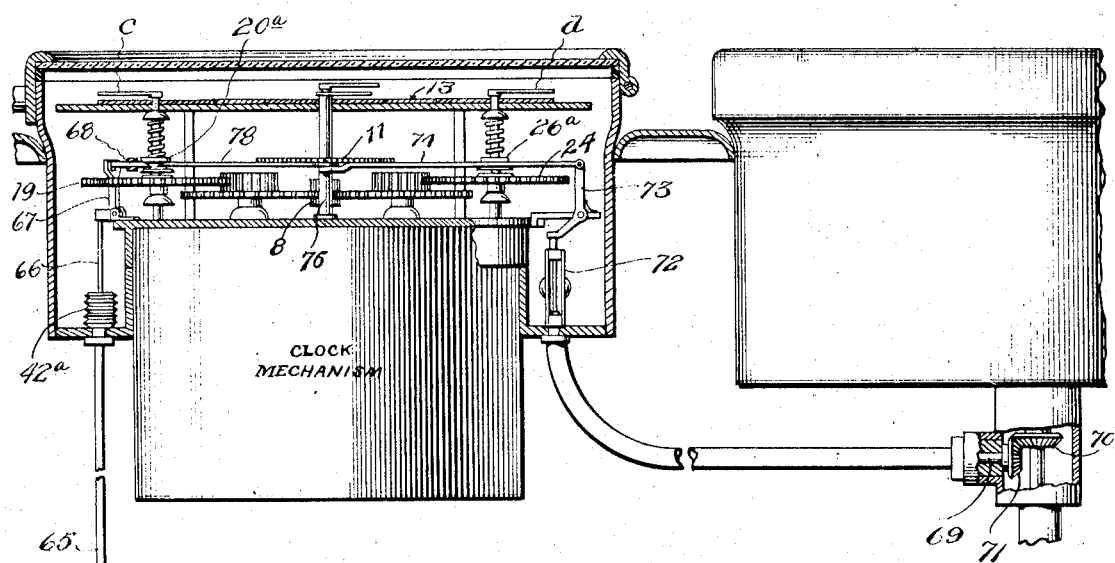
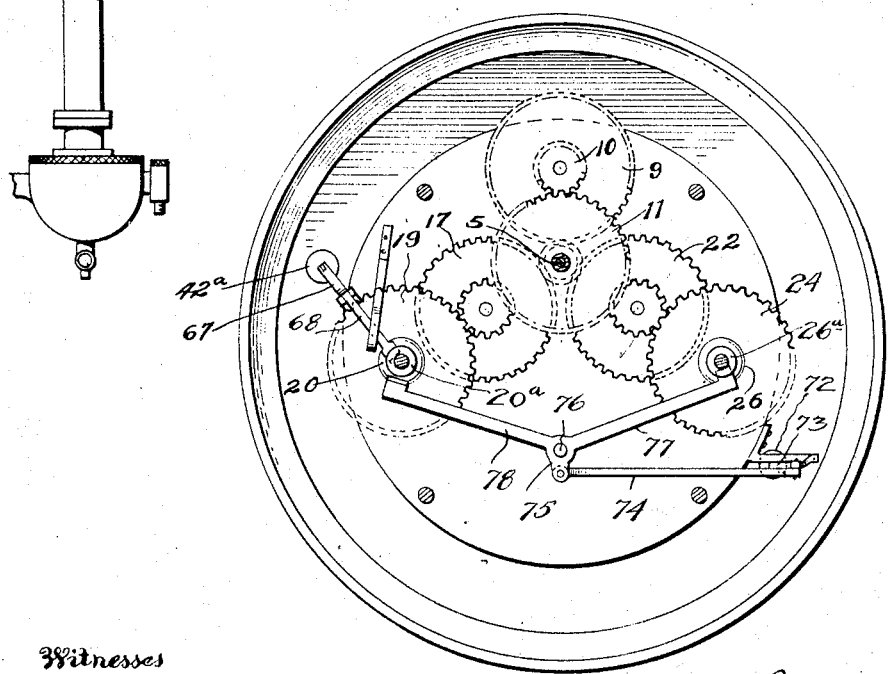
Fig. 8.
Witnesses
Inventor
Robert Watson

UNITED STATES PATENT OFFICE.

ROBERT WATSON, OF SILVER SPRING, MARYLAND.

TIME INDICATOR FOR AUTOMOBILES.

1,415,004.  Specification of Letters Patent.  Patented May 2, 1922.

Application filed April 30, 1919, Serial No. 293,608. Renewed June 10, 1921. Serial No. 476,607.

*To all whom it may concern:*

Be it known that I, ROBERT WATSON, a citizen of the United States, residing at Silver Spring, in the county of Montgomery and State of Maryland, have invented certain new and useful Improvements in Time Indicators for Automobiles, of which the following is a specification.

The purpose of this invention is to provide means, on an automobile equipped with a driving engine of the internal combustion type, for indicating the idling and working time of the engine, as well as the running time of the vehicle, in order that the owner of the vehicle may know how long the vehicle has been in operation during a given trip or series of trips, and how long the engine has been operating idly during the same trip or trips.

While the invention is useful on privately owned and operated vehicles, it is particularly desirable on commercial vehicles, such as trucks and delivery wagons, in order that the owner may be advised whether the driver has operated the vehicle carefully and economically, or whether the machine has been operated in a wasteful and destructive manner. Thus, the driver of a truck or delivery wagon equipped with an internal combustion engine may be sent on a trip which should occupy, say one hour at a moderate rate of speed, and the driver may return after the lapse of an hour, having made the trip; but he may have stopped the vehicle at some point or points on the route for half of that time and then driven the vehicle at an excess speed in order to get back within the hour. When the driver returns, the device of the present invention will show that the vehicle has been in actual operation for only half an hour, and thus the owner is advised that the driver has stopped half an hour on the trip and operated the vehicle at an excess speed during the remainder of the hour allowed for the trip. Again, during the half hour that the vehicle was not in motion, the driver may have neglected to stop his engine, thus entailing a needless waste of fuel and unnecessary wear and tear on the engine. If this occurs, the mechanism of the present invention will indicate, upon completion of the trip, that while the vehicle has been in operation only half an hour, the engine has been in operation for a full hour, thus disclosing to the owner that the driver has caused needless waste and wear by allowing his engine to idle longer than necessary.

In carrying out my invention, I provide suitable time mechanism, such as an automobile clock, and in conjunction therewith, I provide two time indicators which are normally stopped, means for causing one of said indicators to operate while the engine is in operation and the vehicle is stopped, and means for stopping said latter indicator and causing the other indicator to operate while the vehicle is in motion. Thus, one indicator will indicate the idling time of the engine while the other will indicate the time during which the engine is connected to its load, and also the running time of the vehicle.

In the accompanying drawing, which illustrates my invention,

Fig. 3 is a section through the instrument on the line 3—3 of Fig. 4;

Fig. 4 is a section taken immediately under the plate which supports the dial in Fig. 3, showing the instrument associated with a speedometer, and also showing the electrical connections diagrammatically;

Fig. 5 is a section on the line 5—5 of Fig. 4;

Fig. 7 is a vertical sectional view through the running time indicator, showing mechanical connections for starting and stopping the indicators; and, Fig. 8 is a section taken immediately under the plate which supports the dial plate in Fig. 7.

Figure 1:
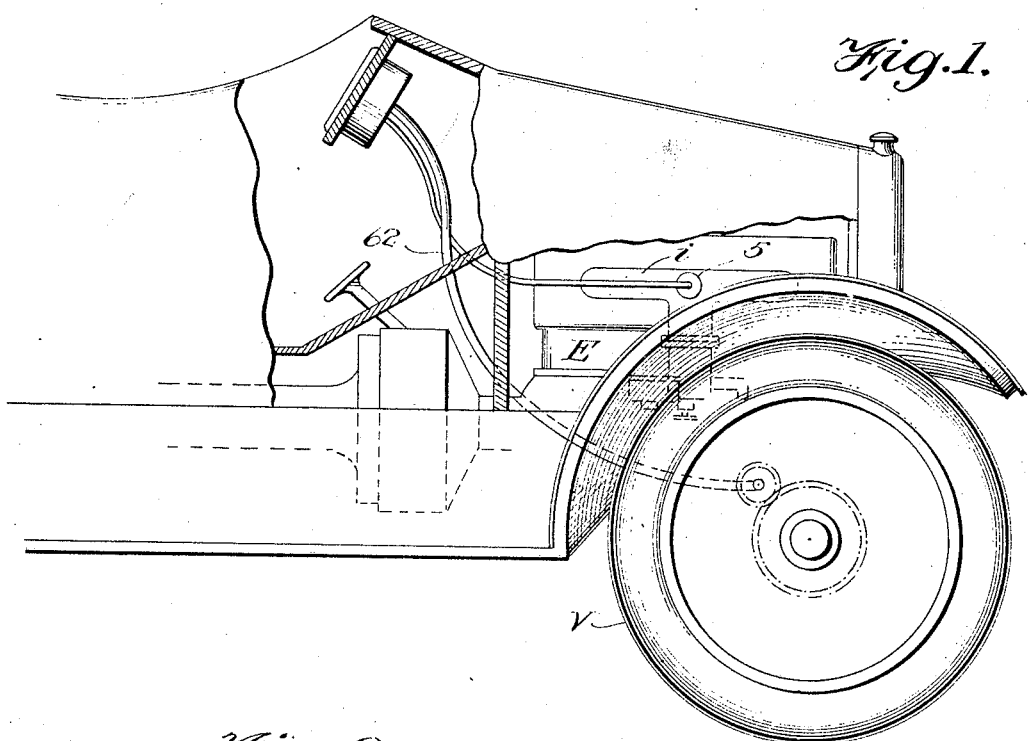
Fig. 1 is a side elevation, partly broken away, of the forward part of a motor vehicle showing connections from the engine and vehicle wheel for controlling the operation of the running time indicators.
Figure 2:
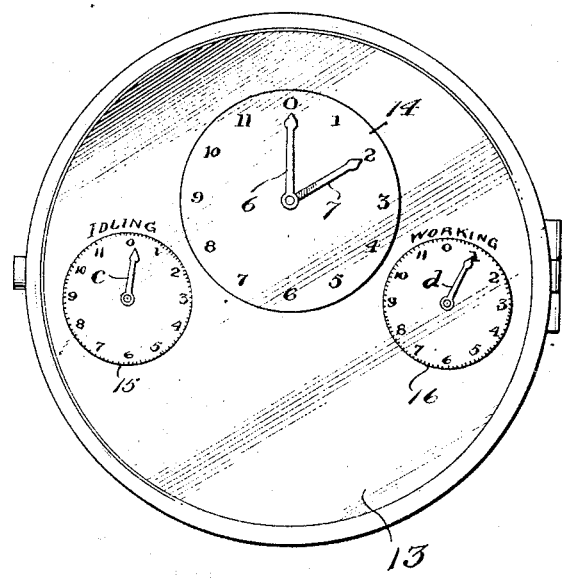
Fig. 2 is a top plan view of the instrument for indicating the running time.
Figure 6:
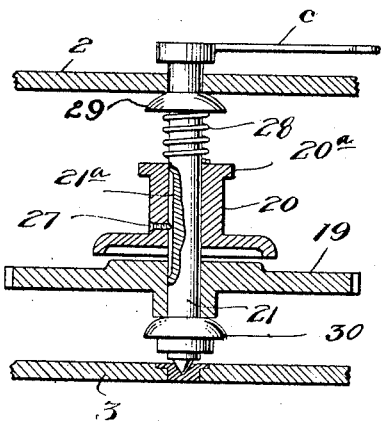
Fig. 6 is a detail showing the spindle of one of the running time indicators and the clutch for connecting it to the time mechanism.

Referring to the drawing, (Figs. 1 to 6) *a* indicates a clock comprising a casing 1, containing the usual time-keeping mechanism, the details of which are not shown. Upon the top of the clock casing is provided a frame *f* comprising two plates 2 and 3, spaced apart by a series of posts 4. The minute hand arbor 5 of the clock extends through the frame *f* and carries the usual minute hand 6, and the hour hand 7 is geared in the usual way to the pinion 8 on the minute hand shaft by a gear 9 which meshes with the pinion 8 and a pinion 10, secured to the gear 9, which latter pinion meshes with a gear 11 on the sleeve 12, which carries the hour hand. Upon the plate 2 is arranged a dial plate 13, which carries three dials 14, 15, and 16. The hands 6 and 7 are arranged over the dial 14 and indicate the time of day. The dials 15 and 16 are marked in divisions indicating hours and fractions thereof, and movable over these dials are indicating hands $c$ and $d$. Gearing is provided whereby the indicators $c$ and $d$, when in operation, will move around their respective dials at the rate of one revolution in twelve hours, the same as the hour hand 7 on the clock; but the indicators $c$ and $d$ are normally stationary. As shown, the indicator $c$ is operated from the pinion 8 on the minute hand arbor of the clock through gear 17, pinion 18, gear 19, and a clutch member 20, the gear 19 being rotatable upon a spindle 21, which carries the indicator $c$, and the clutch member 20 being secured to the spindle so as to turn therewith and being movable into and out of engagement with the gear 19. The gear train for the indicator $d$ is in all respects the same as that for the indicator $c$, and comprises the gear 22, meshing with the pinion 8, the pinion 23 fixed to the gear 22 and meshing with the gear 24, which latter turns loosely on the spindle 25, which carries the indicator $d$, and the clutch member 26 on said spindle is provided for engaging the gear 24 to cause movement of the indicator. The mounting of the spindle, gear and clutch member for operating the indicator $c$ is shown in Fig. 6, and it will be understood that the parts which carry and operate the indicator $d$ are the same. Referring to Fig. 6, the spindle 21 is rotatably mounted in bearings in the upper and lower plates 2 and 3, and the gear 19 is rotatably mounted on the spindle so that if the clutch be disengaged and the spindle held stationary, the gear may be rotated by the time mechanism, without unnecessary friction. The clutch member 20 has an annular shoulder 20ᵃ at its upper end, and a pin 27 in the clutch member extends into a slot 21ᵃ in the spindle, this slot and pin connection permitting the clutch to slide on the spindle but causing the two to rotate together. The clutch member 20 is normally pressed toward the gear 19 by a light spring 28 interposed between said member and a stop 29 on the spindle. The gear 19 rests upon a stop 30, secured to the lower end of the spindle.

The clutch members 20 and 26 are normally held out of engagement with the gears 19 and 24, respectively, so that while the gear trains will be in constant motion, the indicators $c$ and $d$ will be normally stopped.

As shown in the drawing, Fig. 4, two similar levers $g$ and $h$ are provided with forked ends which engage the under sides of the shoulders 20ᵃ and 26ᵃ on the clutch members 20 and 26, respectively. These levers are similarly constructed and mounted. The mounting of one of said levers is shown in Fig. 5. Each lever is pivoted between its ends, as indicated at 31, and a spring 32, attached to the shorter end of the lever, causes the opposite forked end to raise the clutch member against the action of the spring 28. In the embodiment of the invention shown in the drawings, I have provided a magnet 33, for moving the lever $g$ against the action of this spring 32, to cause the clutch 20 to engage the gear 19, and I have provided a magnet 34 for moving the lever $h$, to cause the clutch member 26 to engage the gear 24. The levers $g$ and $h$ carry armatures 35 and 36, respectively, arranged over the poles of the magnets. A block of insulating material 37, secured to the plate 3, supports the magnets and the binding posts for the electrical connections.

Upon the intake manifold $i$ of the engine E is arranged a switch $s$, which is normally open and adapted to be closed by the suction in the intake pipe. This switch comprises fixed contacts 39 and 40 and a metal bridge-piece 41, the latter movable by a hollow diaphragm or bellows 42. When the engine is started, the suction causes the diaphragm to collapse and move the bridge-piece 41 into engagement with the contacts 39 and 40, and when the engine stops the suction ceases and the diaphragm expands, causing the bridge-piece 41 to move out of engagement with the fixed contacts. One of the fixed contacts, 39, is connected by conductor 43 to one pole of the battery 44, and the other pole of the battery is grounded on the frame of the motor by a ground wire 45. The other contact 40, of the switch $s$, is connected by conductor 46 to a binding post 47 on the insulating block 37. The circuit for the magnet 33 extends by conductor 48 to the magnet coil, and thence to a contact arm 49, which is secured to the insulating block 37 and extends over a contact 50 on the lever $h$, which contact is normally in engagement with a contact 51 on the arm 49. The lever $h$ is grounded, as indicated by the ground wire 52. It will be seen from the description of the circuits thus far, that when the switch $s$ is closed by the operation of the motor, current will flow from the battery 44 through said switch, and the coils of magnet 33, to the contact arm 49, lever $h$, and thence to the battery through the ground connections. This will cause the magnet 33 to rock the lever $g$, and the clutch member 20 will thereby be brought into engagement with the gear 19 and the indicator hand $c$ will move with the time mechanism.

When the magnet 33 is de-energized, the lever $g$ will return to its normal position and lift the clutch member 20 away from the gear 19, thereby stopping the movement of the indicator $c$. The magnet 33 may be de-energized either by the stoppage of the motor, which will result in the opening of the switch $s$, or by the separation of the contacts 50 and 51, which will occur if the magnet 34 is energized. The circuit for the magnet 34 extends from the binding post 47, through conductor 53 to binding post 54, thence to the coil of magnet 34, and thence to binding post 55. From the latter binding post, conductor 56 leads to an insulated contact 57, of a switch $s'$, which is controlled by the movement of the vehicle, and which is always closed while the vehicle is in motion and opens when the vehicle stops. This switch may be conveniently actuated by a movable part connected with the speedometer J, and such an arrangement is shown in the drawing. As shown, the movable part of the switch comprises a centrally pivoted arm 58, spring pressed toward the contact 57 but normally held out of engagement with said contact by a disk 59, which bears upon a roller upon one end of the arm, when the vehicle is stopped. This disk, as shown, is connected to a rack 60, having annular teeth, which is moved upward by the governor balls 61, when the speedometer is actuated by the usual flexible shaft connection 62 to the vehicle wheel V. Thus, when the vehicle starts to move, the disk 59 will be raised and the switch $s'$ will be closed, and when the vehicle stops the disk 59 will move downward and cause the switch $s'$ to open. The switch arm 58 is grounded, as indicated by the ground wire 63. Thus, the magnet 34 is normally de-energized, but when the vehicle starts the switch $s'$ will be closed and the magnet will be energized, causing the lever $h$ to rock, and the clutch 26 will thereby be lowered into engagement with the gear 24, and the indicator $d$ will thus be set in motion to indicate the running time of the vehicle. When the lever $h$ is drawn downward by the magnet 34, the circuit of the magnet 33 is interrupted at the contacts 50 and 51 and the latter magnet thereby becomes de-energized. When the vehicle stops, the switch $s'$ is opened, interrupting the circuit of the magnet 34, and the lever $h$ moves upward, dis-connecting the indicator $d$ from the time mechanism and establishing the circuit of the magnet 33 at the contacts 50 and 51.

The operation is as follows. When the motor is started, the suction of the engine causes the switch $s$ to close and the magnet 33 is thereby energized and the lever $g$ is rocked, causing the indicator $c$ to be connected to the time mechanism. As long as the vehicle is stopped and the engine is running idly, the indicator $c$ will move and register the idling time of the engine on the dial 15. If, now, the vehicle is started by connecting the engine to the driving wheels, the working parts of the speedometer will be moved and during the initial movement of such parts, the switch $s'$ will be closed and the magnet 34 will cause the lever $h$ to rock, thereby causing the indicator $d$ to be connected to the time mechanism and simultaneously interrupting the circuit of the magnet 33, thereby causing the indicator $c$ to be disconnected from the time mechanism. If the vehicle is now stopped, without stopping the engine, the switch $s'$ will be automatically opened, interrupting the circuit of the magnet 34, and the lever $h$ will disconnect the indicator $d$ from the time mechanism and make up the circuit of the magnet 33 at the contacts 50 and 51. The magnet 33 will then attract its armature and the lever $g$ will rock, permitting the indicator $c$ to again engage the time mechanism. If the motor is now stopped, the circuit will be broken at the switch $s$, the magnet 33 will be de-energized, and the indicator $c$ will be disconnected from the time mechanism.

From the foregoing, it will be evident that one of the indicators will indicate the idling time of the motor, while the other indicator will show the running time of the vehicle, and approximately the working time of the motor. If the hands $c$ and $d$ are set at the same point on their respective dials at the commencement of a trip, the hand $c$ will show very little advance during the trip if the motor is operated without useless idling; but should the operator fail to stop his motor at times when the vehicle is stopped, the hand $c$ will advance during such intervals and will indicate all of the idling time. Where long stops of the vehicle are made without stopping the motor, the hand $c$ may move as far or farther than the hand $d$, which indicates the working time. Thus, the owner of the vehicle by comparing the hands $c$ and $d$ can determine whether the motor is being operated idly to a greater extent than is necessary. Also, if the operator is given say two hours to make a trip, at a moderate speed, and instead of running for two hours he runs at an excessive speed for one hour and stops at some point on the route for another hour, getting back within the time limit, the hand $d$ will show that the vehicle has been running only one hour of the two hours allowed for the trip, and it will be plain that the operator must have run at an excessive speed during the actual running time.

There are various ways in which the time indicators may be controlled by the engine and the vehicle, which is its load. In Figs. 7 and 8, the arrangement of the indicators and the clock trains is the same as in the previously described figures, but instead of employing electric means for controlling the indicators, I have shown mechanical connections for the same purpose. In Fig. 7, the hollow diaphragm 42ª is arranged upon the instrument and connected by tubing 65 to the intake pipe of the engine, and this diaphragm operates a rod 66, connected to a bell crank lever 67, which moves a sliding rod 68, having a beveled end which normally engages the underside of the shoulder 20ª on the clutch 20 and holds the latter out of engagement with the gear 19. When the engine starts, it will be evident that the diaphragm 42ª will collapse and thereby cause the rod 68 to be moved out of engagement with the clutch member, and the latter will engage the gear 19. On the other hand, when the engine stops, the diaphragm will expand, and the rod 68 will move the clutch member out of engagement with the gear. In Fig. 7, a flexible shaft 69 is driven from the speedometer shaft through gears 70 and 71, and a small centrifugal governor 72, associated with the time indicator, actuates a bell crank lever 73 which, in turn, moves a rod 74 connected to an arm 75 on an upright spindle 76. This spindle carries an arm 77, having a beveled end which normally engages the shoulder 26ª on the clutch 26 and keeps said latter member out of engagement with the gear 24. Another arm 78 projects from the opposite side of the spindle and has a beveled end adapted to engage the underside of the head 20ª on the clutch member 20. The lever 78, however, is normally out of engagement with the head 20ª, the latter being supported by the arm 68, while the engine and vehicle are stopped.

In Figs. 7 and 8, when the motor starts, the vehicle being stopped, the indicator c is connected to the time mechanism, as above described, by the collapse of the diaphragm 42ª. When the vehicle starts, the governor 72 causes the spindle 76 to rock and the arm 77 thereby moves out of engagement with the clutch member 26, allowing the latter to engage the gear 24, and, at the same time, the arm 78 moves under the head 20ª on the clutch member 20, thereby lifting the latter out of engagement with the gear 19, so that the indicator c is stopped, while the indicator d continues to move. When the vehicle stops, the governor 72 rocks the arms 77 and 78 to normal positions, thus stopping the indicator d and permitting the clutch member 20 to engage the gear 19. If, now, the engine is stopped, the expansion of the diaphragm 42ª will cause the rod 68 to lift the clutch member 20 and the indicator c will stop The clock hands 6 and 7 may be used in the ordinary way to note the time of day; or, they may be set at zero at the commencement of a trip, along with the hands c and d, in which case the hands 6 and 7 will indicate the actual amount of time consumed on the trip, the hand c will indicate the idling time of the engine, and the hand d the working time of the engine and running time of the vehicle.

What I claim is:

1. The combination with an automobile having an internal combustion driving motor, of means for indicating the idling time of the motor comprising time mechanism, a time indicator operable thereby but normally stopped, means for causing the operation of the indicator while the motor is running and the vehicle is stopped, and means for stopping the indicator when the vehicle starts.

2. The combination with an automobile having an internal combustion driving motor, of time mechanism, two time indicators operable thereby but normally stopped, means for causing the operation of one of said indicators while the motor is running and the vehicle is stopped, and means for stopping said latter indicator and causing the other indicator to operate while the vehicle is in operation.

3. The combination with an automobile having a driving motor of the internal combustion type, of two time indicators, normally stopped, time mechanism for operating said indicators, means for operatively engaging one of said indicators with the time mechanism while the motor is operating idly and the vehicle is stopped, and means for stopping said latter indicator and operatively engaging the other indicator with the time mechanism while the vehicle is in operation.

4. The combination with an automobile having an internal combustion driving motor, of time mechanism, a time indicator operable thereby but normally stopped, and means controlled by the suction of the engine for causing the operation of the indicator.

5. The combination with an automobile having an internal combustion driving motor, of time mechanism, a time indicator normally disconnected from said mechanism, means controlled by the operation of the engine for operatively connecting said indicator to the time mechanism, and means controlled by the operation of the vehicle for disconnecting the indicator from said mechanism.

6. The combination with an automobile having an internal combustion driving motor, of time mechanism, two time indicators normally disconnected from said mechanism, means controlled by the operation of the engine for operatively connecting one of said indicators to the time mechanism, and means controlled by the operation of the vehicle for operatively connecting the other of said indicators to the time mechanism and for disconnecting the first mentioned indicator from said mechanism.

7. The combination with an automobile having an internal combustion driving motor, of time mechanism having hands or indicators normally connected thereto and two time indicators normally disconnected therefrom, of means controlled by the motor and vehicle, respectively, for separately connecting said latter indicators to the time mechanism, said vehicle-controlled means operating to disconnect the indicator controlled by the motor from the time mechanism.

In testimony whereof I affix my signature.

ROBERT WATSON.